(12) United States Patent
Schaller

(10) Patent No.: US 8,240,730 B2
(45) Date of Patent: Aug. 14, 2012

(54) PNEUMATIC ACTUATOR

(75) Inventor: Werner Schaller, Berikon (CH)

(73) Assignee: Prospective Concepts AG, Dietikon (CH)

( * ) Notice: Subject to any disclaimer, the term of this patent is extended or adjusted under 35 U.S.C. 154(b) by 628 days.

(21) Appl. No.: 12/089,145

(22) PCT Filed: Oct. 10, 2006

(86) PCT No.: PCT/CH2006/000560
§ 371 (c)(1),
(2), (4) Date: Sep. 12, 2008

(87) PCT Pub. No.: WO2007/041887

PCT Pub. Date: Apr. 19, 2007

(65) Prior Publication Data
US 2009/0200816 A1   Aug. 13, 2009

(30) Foreign Application Priority Data
Oct. 10, 2005 (CH) ........................................ 1637/05

(51) Int. Cl.
*B66C 1/42* (2006.01)
(52) U.S. Cl. ...................... 294/119.3; 294/98.1
(58) Field of Classification Search .................. 294/63.2, 294/98.1, 119.3; 5/644, 654, 655.3, 710, 5/713
See application file for complete search history.

(56) References Cited

U.S. PATENT DOCUMENTS

| 3,056,625 | A | | 3/1961 | Timmerman | |
|---|---|---|---|---|---|
| 3,606,623 | A | * | 9/1971 | Aymar | 5/660 |
| 3,713,685 | A | | 1/1973 | Ewing | |
| 4,782,542 | A | * | 11/1988 | Sato | 5/706 |
| 4,870,962 | A | * | 10/1989 | Sitnik | 128/205.13 |
| 5,245,885 | A | | 9/1993 | Robertson | |
| D340,829 | S | * | 11/1993 | Neral | D6/604 |
| 5,311,625 | A | * | 5/1994 | Barker et al. | 5/615 |
| 5,345,630 | A | * | 9/1994 | Healy | 5/708 |
| 7,360,266 | B2 | * | 4/2008 | Kasatshko | 5/722 |
| 7,380,301 | B2 | * | 6/2008 | Chung | 5/713 |
| 2002/0002867 | A1 | | 1/2002 | Shishihara et al. | |

FOREIGN PATENT DOCUMENTS

| DE | 2615087 | 11/1976 |
|---|---|---|
| JP | 5261687 | 10/1993 |

OTHER PUBLICATIONS

Blumenburg, Claus, International Search Report for PCT/CH2006/000560 as mailed Apr. 1, 2007 (4 pages).

* cited by examiner

*Primary Examiner* — Dean Kramer
*Assistant Examiner* — Stephen Vu
(74) *Attorney, Agent, or Firm* — Winstead PC

(57) ABSTRACT

The invention relates to a pneumatic actuator composed of cuts of a gas-tight film which are interconnected so as to form hollow film elements that are gas-tight towards the outside. The hollow film elements are interconnected by means of air ducts while forming a fan-shaped structure from a cross-sectional perspective. The actuator, which is fastened to a component, is swiveled about a common edge of the hollow film elements when compressed gas is delivered via a connection. The swiveling movement of the actuator can be used for gripping and holding objects or transmitting optical signals.

8 Claims, 6 Drawing Sheets

PNEUMATIC ACTUATOR

BACKGROUND

1. Field of the Invention

The present invention relates to a pneumatic gripper comprising at least one pneumatic structural element.

2. History of the Related Art

The devices nearest to the present invention are known from U.S. Pat. No. 3,056,625, Timmerman (D1) and JP 05261687, Bridgestone (D2).

D1 describes a gripper for goods which is configured as a clamp and has grippers held movably on its lateral vertically disposed sections by means of hinges. Located between each vertically disposed section and the associated gripper is an inflatable bellows which, under pressure, pushes the gripper away from the vertical section towards the inside of the gripper so that the goods are grasped by the gripper.

D2 also describes a gripper configured in the manner of a clamp with lateral vertically disposed sections. A supporting arm runs parallel to each of the vertical sections, on the inner side thereof, said supporting arm for its part being movably hinged in the cross member of the gripper by means of a hinge. Inflatable cushions are provided on each supporting arm which, when filled with compressed air, press the supporting arms away towards the inside (whereby said cushions also move inwards since they are disposed on the supporting arms).

These known grippers have the disadvantage of a rigid structure, for example, with the consequence that they can only be used in a vertical position.

SUMMARY

The object of the present invention is to provide a pneumatic gripper which is simple and inexpensive to manufacture and use and its construction principle is constituted in such a manner that it can be flexibly configured and varied both as a kinetic and as a dynamic tool, and fulfils its task in any, even non-vertical, position and also under difficult boundary conditions.

The gripper should be able to satisfy various requirements such as sterilisability and the handling of sensitive objects, for example, in conjunction with a handling robot. These requirements include the easy exchangeability of a, for example, soiled or otherwise contaminated specimen.

The solution of the formulated object is reproduced in the characterising part of claim 1 with regard to its main features and in the following claims with regard to further advantageous embodiments.

An advantageous embodiment of a pneumatic actuator according to the invention is in particular characterised in that [0010] this is constructed of a plurality of interconnected layers of film cuts (22) of a flexible but barely expandable gastight film (1), [0011] the layers of the film cuts (22) are interconnected so as to form hollow film elements (2), [0012] at least one of the hollow film elements (2) has a connection (8) for compressed gas, [0013] the hollow film elements (2) thus constructed are all connected to one another so that when said hollow film elements (2) are filled with compressed gas, these interconnected hollow film elements (2) execute a pivoting movement as an actuator (24).

BRIEF DESCRIPTION OF THE DRAWINGS

A more complete understanding of the method and system of the present invention may be obtained by reference to the following Detailed Description when taken in conjunction with the accompanying drawings wherein.

DETAILED DESCRIPTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1A:
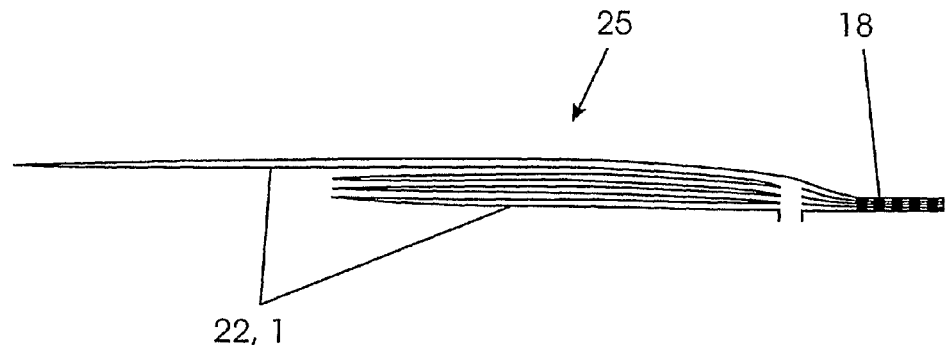
FIG. 1a is a pneumatic actuator in the uninflated state.
Figure 1B:
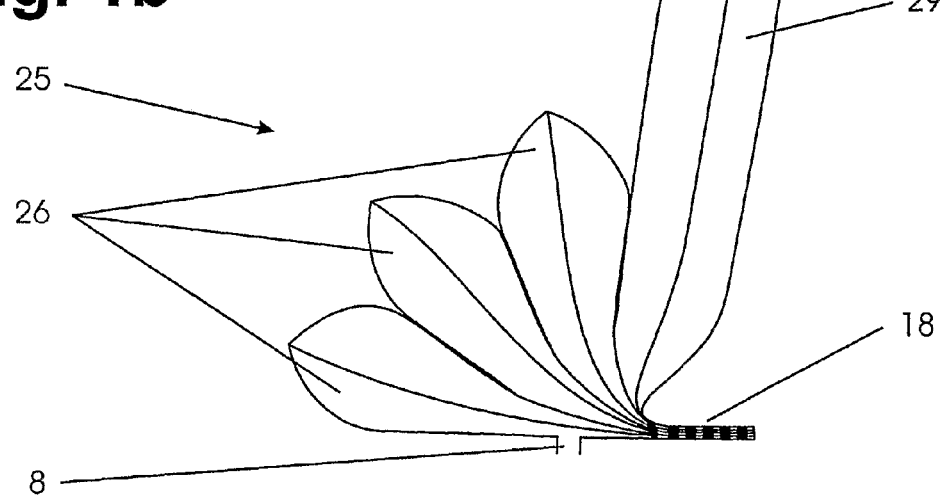
FIG. 1b is a pneumatic actuator in the state filled with pressure medium.
Figure 1C:
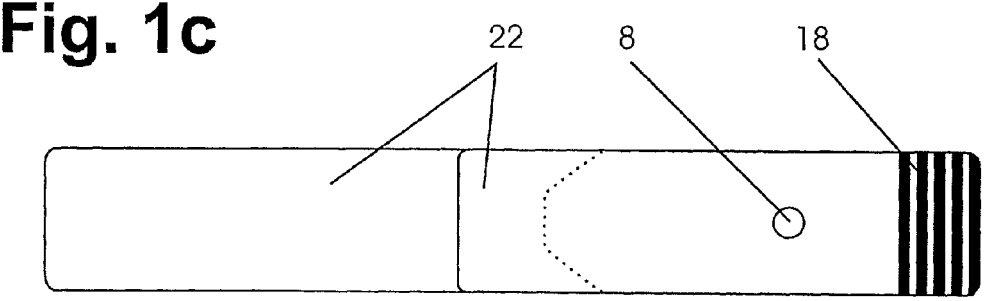
FIG. 1c is a top view of a pneumatic actuator.

FIGS. 1a, b, c is a diagram of a first embodiment of the device according to the invention; FIG. 1a shows a side view in the pressure-less state, FIG. 1b shows a view in the state filled with compressed gas, FIG. 1c shows a plan view from below (with respect to FIG. 1a) in the pressure-less state. This exemplary embodiment, like the following embodiments, is constructed of film cuts 22 of a flexible but barely expandable gastight film 1, which form a fan-shaped structure in cross-section. This film can also be a textile reinforced plastic film. At the edges, these film cuts 22 are each joined by welding or adhesive bonding and are thus closed in a gastight manner against the environment. The hollow film elements 2 thus formed are connected to one another by air ducts. Compressed gas can now be let in by means of a suitably shaped connection 8 whereby the individual hollow film elements 2 are pressed apart from one another. If this movement is restricted to one side of the hollow film elements 2, this changes into a swivelling movement whereupon the structure constructed of the film cuts 22 and being gastight towards the outside, is deformed as an actuator 25, as shown in FIG. 1b.

FIG. 1c shows the structure of the actuator viewed from below with reference to FIG. 1a. The inner boundaries of the film cuts 22 are shown by solid lines whilst the inner boundaries of the film cut-outs 22 of a plurality of hollow film elements 26, 29 formed by the inner boundaries of the corresponding film cuts 22 are depicted by dashed lines.

In all three FIGS. 1a, b c, the film cuts 22 are placed one upon the other at the closed end and welded or adhesively bonded together.

A common edge 18 is thereby formed where the actuator 25 can be fixed, for example, on a stationary or movable external device. However, this is in no way compulsory: the connection 8 or, again as an example, the underside of one of the hollow film elements 26, in this case the lowest one, can be held firmly by suitable means and measures. What is important is the relative swivelling movement of the hollow film elements 26 and 29.

The actuator 25 thus configured can now be used as a kinetic actuator, still in the sense of an example of application, for example, for interrupting a light barrier or as an optical signal generator. The longest of the, in this case four, hollow film elements 29 can be relatively long since a substantially circular tube having high stiffness is formed from this hollow film element 29 when filled with compressed gas.

Figure 2:
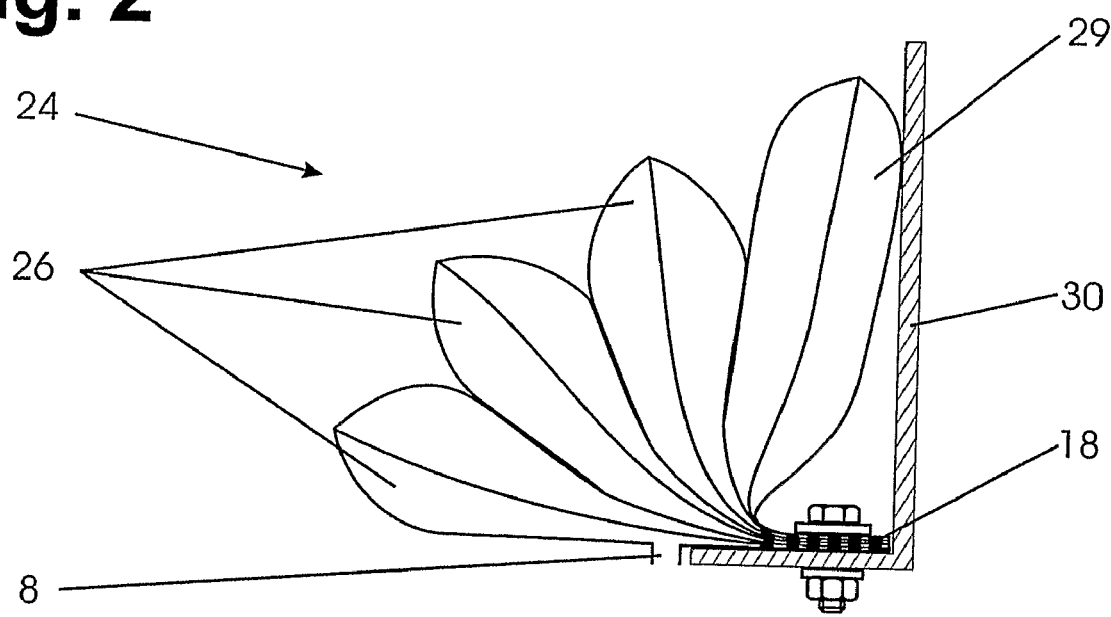
FIG. 2 is a pneumatic actuator as a single-leaf gripper.

If the hollow film element 29 is designed to be approximately the same length as the other, in this case three, hollow film elements 26, an actuator 24 exerting forces can be constructed therefrom as shown in FIG. 2, corresponding to FIG. 1b, a so-called dynamic actuator. The said swivelling movement is used for gripping or holding objects. Here, the position 23, the welding or adhesive bonding of the film cuts 22, is fixed on a component 30 which is shown representatively as an angle. The person skilled in the art, who is entrusted with constructive tasks, will have many other designs available with which the positive and moment engagement of the actuator 24 with one corresponding to the component 30 can be accomplished. Such a combination of actuator 24 and component 30 is suitable, for example, as a gripper for leaf-like, i.e. substantially two-dimensionally extended bodies.

Since both the actuator 24 and also the actuator 25 have very low inertial masses, the inertial forces associated with their acceleration are very low; rapid gripping and release is thereby easily possible.

Figure 3A:
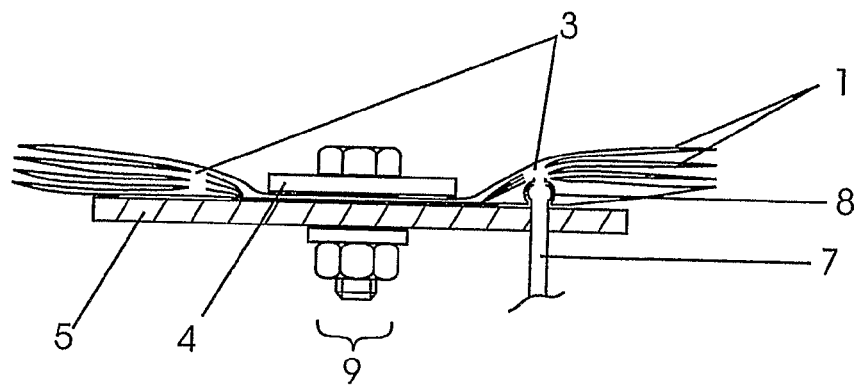
FIG. 3a is a side view of a two-leaf gripper in the empty state.

FIG. 3a b shows a third exemplary embodiment of an actuator according to the invention. In this case, two actuators 24 are assembled, where with the aim of rational manufacture, in each case both parts of the same plane are cut on one piece. In FIGS. 3a, b the two actuators are fixed by means of a fastening element 9 (in this case, shown representatively as a screw with a nut) on a base plate. The actuators 24 together form a gripper, again preferably for flat objects.

A gripper is formed from one or more actuators 24, 31 which are called gripper elements. In contrast to conventional grippers where actuators and grippers are separate components, here these are combined in one element. That surface of the gripper element 6 which touches the object to be gripped is called gripping surface 10. In at least one of the hollow film elements 2 nearest to the base plate 5, a connection 8 is provided for compressed gas. A plurality of possibilities is known for such a connection; for example, a hose connection at the compressed air supply 7 or a push-button-type quick coupling can be used. No mechanical parts such as pins, screws, locking devices etc. are present, whereby any risk caused by falling out or other malfunction can be eliminated.

By regulating the amount of through-flowing gas or the pressure, the gripping force can be adjusted and metered very precisely and free from hysteresis. The gripper elements can be positioned very precisely since the gripping process takes place free from jolts and pressure peaks (stick-slip free). The usual inaccuracy during positioning with hydraulic cylinders is lacking. The pressure or flow sensors required for this purpose and the controller are attached outside the gripper, for example, on a handling robot whereby a gripper can be exchanged independently of these.

The inflatable hollow film elements 2 retain a certain flexibility so that it is possible to resiliently grip sensitive objects 20 or those having complex shapes over a large area. Since the force exerted by the gripper on the body is not punctiform but is exerted so that it is distributed on a surface adapted to the object, the point stressing of the object is reduced. As a result of the large contact surface, a large retaining force can be achieved with low filling pressure. The retaining force can be further increased by using specialised surfaces 15, 16, 17. It is also feasible to additionally protect such surface regions by a protective film or by another suitable reinforcement, for example, against mechanical or chemical damage. The flexibility of the gripping surface 10 also makes it possible to use the same gripper for different objects. Since it is partially adapted to the object, no specialised gripper need be used which is only suitable for a single type of object. The adapting capability can be achieved by additional reinforcement of the surface regions 15, 16, 17 whereby, for example movably interconnected plates are provided for reinforcement. Object-dependent reinforcements in the manner of the adapted "thimble" are also possible, which thanks to the adaptability of the gripper, still allows a non-specialised gripper to be used, then reinforced for special objects by an adapted thimble.

Figure 3B:
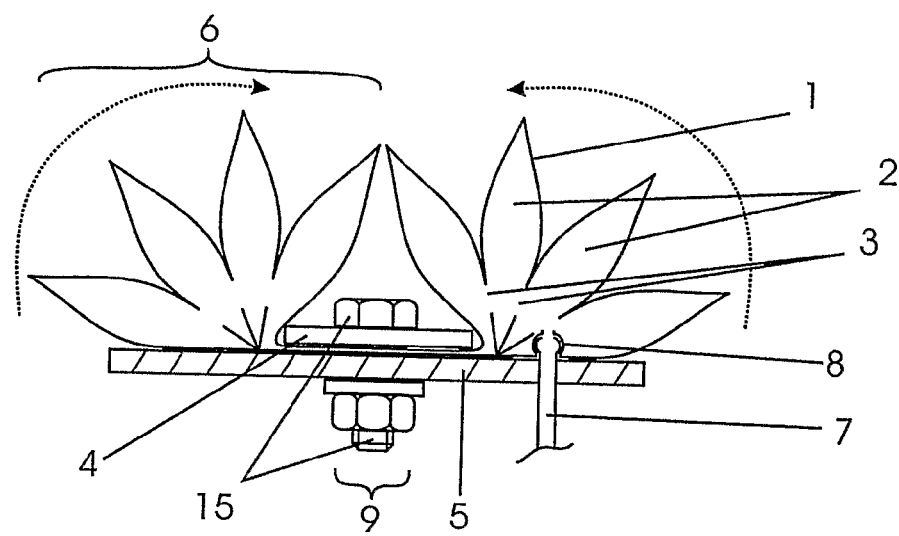
FIG. 3b is a two-leaf gripper in the state filled with pressure medium.
Figure 4:
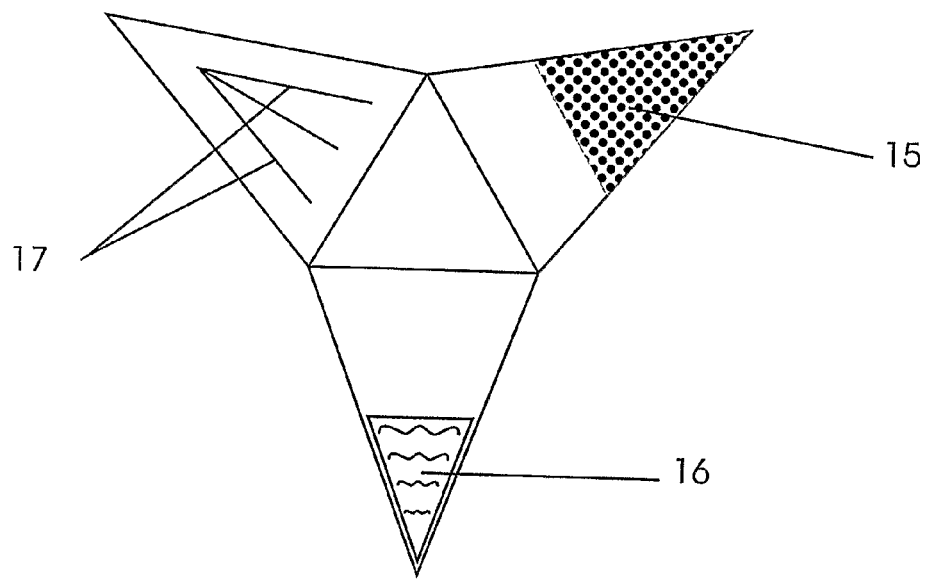
FIG. 4 is a typical film cut of a three-leaf gripper.
Figure 5A:
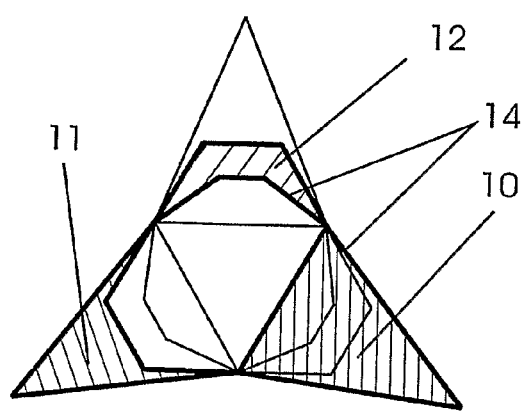
FIGS. 5a, 5b show further film cuts of the three-leaf gripper.
Figure 5B:
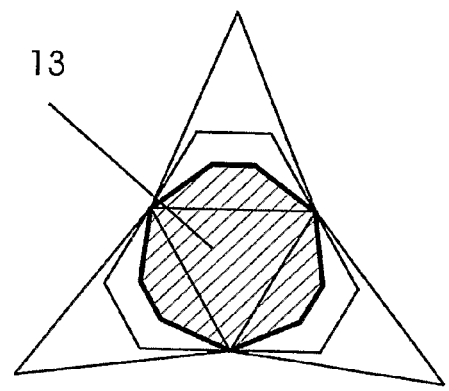
Figure 6:
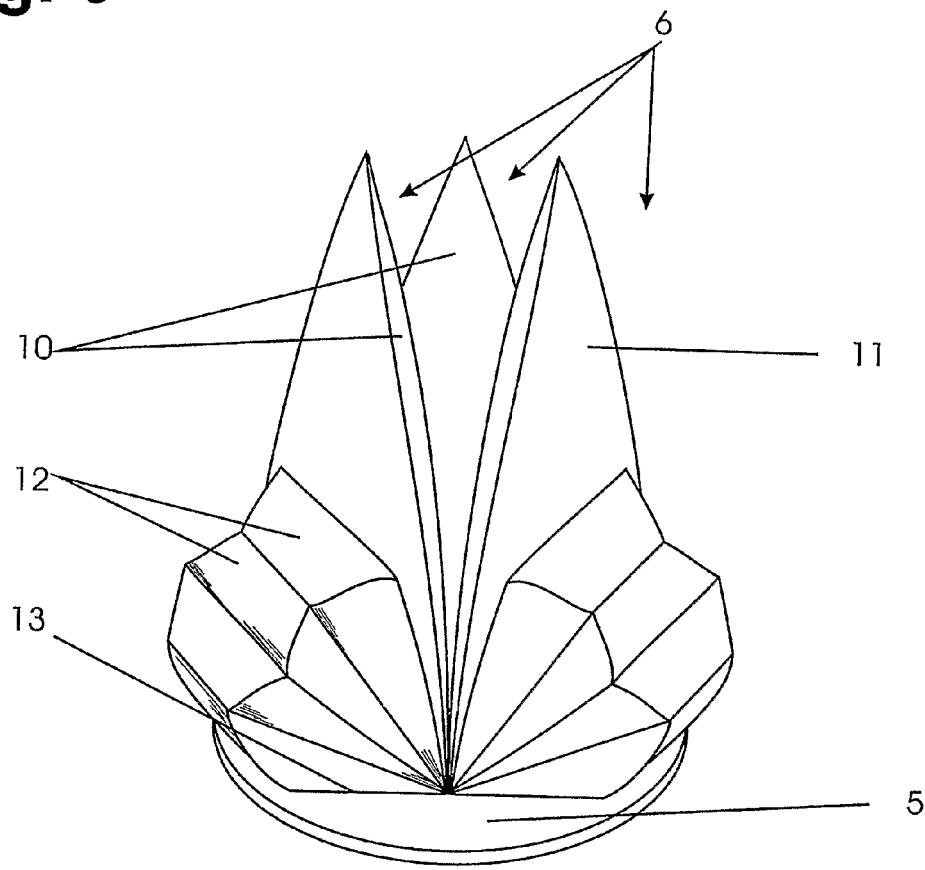
FIG. 6 is a three-leaf gripper in the activated state, i.e., filled with pressure medium, in an isometric projection.

The exemplary embodiment of actuators according to the invention shown in FIGS. 4 to 6 has a similar structure to those in FIGS. 1 to 3. Instead of a mirror symmetry of the actuators according to FIGS. 3a, b, a multiple, for example, threefold axial symmetry appears. In this case, three actuators 31 are combined to form a gripper.

The actuators 31 according to the invention are constructed of superposed plastic films 1 which are joined to one another at predefined seams 14. The join can again be made by welding or adhesive bonding. The material used allows simple steam or radiation sterilisation. Such actuators 31 assembled to form a gripper 31 can be welded into a package and delivered sterile. These actuators 31 are simple and therefore inexpensive to manufacture since the plastic films 1 used comprise a flat material that can be joined to one another with flat welded or adhesive joints. Together with the low material costs, this design principle allows grippers to be manufactured at such low prices that they can be used as disposable articles. The entire gripper is made of a single material which makes disposal feasibly simple. Therefore, a contaminated gripper can easily be exchanged for a new sterile one. Expensive cleaning and sterilisation processes such as are required for conventional mechanical grippers are superfluous. In industrial applications in which grippers become contaminated, exchanging them saves complex and cost-intensive cleaning processes. Corrosion damage due to permanent contact with aggressive media can be eliminated. Exchanging also makes maintenance work which would also be necessary in a mechanical gripper due to wear effects superfluous. The elimination of all maintenance and cleaning work on the gripper substantially simplifies operation and saves a large part of the costs which would be incurred with a conventional gripper.

The areas of application for such a pneumatic gripper are numerous, not least because it can be manufactured and used in various sizes in the meter to the millimeter range. Its advantages also make it ideal for all areas where clean or sterile operation is required as in the pharmaceutical area or in analytical laboratories. Freedom from bacteria is also an important aspect to be satisfied in the food sector. Contamination problems can be eliminated in biotechnology or chemical applications since a contaminated gripper can be simply exchanged and disposed of. In industrial areas where the gripper is exposed to strongly aggressive media or becomes strongly contaminated such as, for example, by spray mist in painting work and cleaning would be expensive, this is eliminated. Costly repair work due to wear is also eliminated. As a result of its purely pneumatic mode of operation, it also fulfils the requirements for working areas in which explosion protection is required.

Furthermore, the structure of the gripper according to the invention is ideal specifically for use in contaminated areas. Under laboratory conditions or production conditions, contaminated areas are frequently spatially separated areas which are operated by remote control from outside using special tools. If openings need to be provided in enclosures or walls separating contaminated areas (or areas to be kept clean or sterile), these should be configured to be as small as possible. By suitably configuring the hollow film elements 2 or by suitably folding together and optionally by miniaturised design of a gripper according to the invention, as shown for example in FIG. 9, this can be passed through openings which are small compared to the inflated gripper elements 6 and are small compared to the objects to be gripped.

Pressure sensors and control equipment are expensive compared with the gripper. So that the gripper can be exchanged independently of these, they are attached outside the gripper. A screw or a push button, for example, can be used as a fastening element 9 to fasten the hold-down device 4 as well as the films 1 on the base plate 5. Using a quick-coupling, for example, in the form of a push button makes exchanging the gripper very simple.

The basic structure of a gripper constructed of three actuators 31 according to FIGS. 4, 5, 6 consists of polygonal elements. This structure prevents any movement of the gripper in a direction of movement (shown by the arrow) other than that desired without external stabilising elements needing to be attached for this purpose. For example, the triangular basic structures of the three-finger gripper shown in FIG. 4 prevent any twisting of the gripper elements 6 about their longitudinal axis. Starting from the configuration of the gripper according to FIGS. 4, 5 and 6, the person skilled in the art is able to form the actuators or grippers according to the other exemplary embodiments in such a manner that external stabilising elements can be omitted. This assists the flexible range of use of such an actuator or gripper, for example, in those places where rigid external flexible elements prevent the use of an actuator or gripper for reasons of space. Thus, for example a gripper according to FIGS. 3a and 3b can then move the gripper elements 6 only in the desired direction of movement indicated by the arrows without external stabilising elements if the fastening element 9 configured as a screw with a nut is suitably positioned; this is again the case if the nut or the washer shown in the figure firmly clamps both gripper elements 6 symmetrically (i.e. precisely centrally). A gripper according to FIGS. 1a to 1c will have a stable direction of movement if the hollow film elements 26, 29 at the edge 18 are firmly connected to one another over the entire width and also if the gripping hollow film element 29 is configured to be narrower than the adjoining hollow film element 26. The element 29 then rests centrally in the element 29, also presses this in centrally so that the element 26 laterally supports the element 29 by means of its lateral edge zones which produces a stabilising supporting effect for said element in the sense of the desired direction of movement. This stabilising effect can be further improved if the respectively next element 26 is broader than the preceding element 26.

It is found that by suitably conceiving the number of hollow film elements 29, 29; 10, 12, 13 in conjunction with their shape (polygonal, non-polygonal; narrower or wider compared with another such element) and their mutual fastening (for example, over the entire width of the respective element or not), the optimum result can be achieved with regard to the desired gripping movement or direction and the desired gripping position. A gripper can thus be specifically optimised for a certain intended use.

For preciseness, it should be added that the lower hollow film elements 2 located closer to the base plate 5 are shortened in their length to improve the efficiency.

Figure 8:
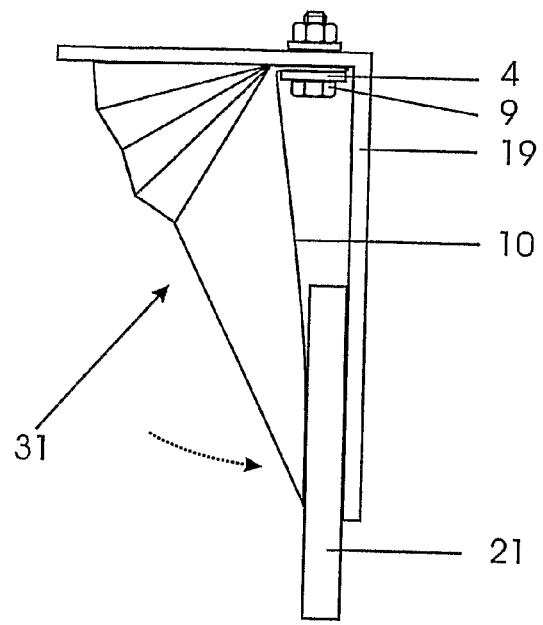
FIG. 8 is a single sheet according to FIG. 7 as a single-leaf gripper.

The number of actuators 31 used for a gripper can be adapted to the intended use: a two-finger gripper according to FIG. 3 or a one-finger gripper according to FIGS. 3, 8 which presses the object 21 against a counterpart 19 is suitable for flat or planar objects 21.

FIG. 8 shows an embodiment according to the invention of a one-finger gripper with an actuator 31 with which a flat object 21 can be pressed against a counterpart 19. The configuration of the counterpart 19 is not part of the invention; it can be configured according to the nature of the object 21 and that of the machine element on which such a gripper is to be placed.

The actuator 31 is fastened on the counterpart 19, designed as an angle, which at the same time serves as the base plate and closes the force flow to the actuator 31. A force meter, for example, in the form of a strain gauge, can be attached on the counterpart 19. For rather cylindrical or spheroidal elements, grippers having three or more actuators 31 according to FIG. 4 are better suited since sliding away of the element in the direction tangential to the base plate 5 is prevented.

Figure 7:
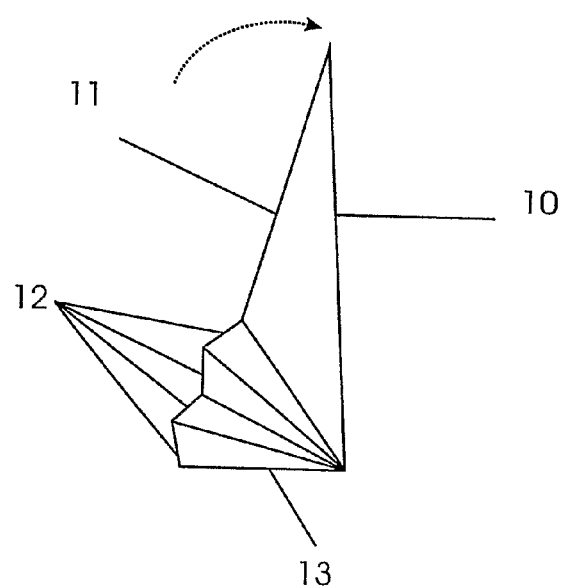
FIG. 7 is a side view of a single leaf of a three-leaf gripper.

FIG. 6 shows a gripper consisting of three actuators 31 in isometric projection, and FIGS. 5a and 5b show the outlines of films from which these are constructed. In this case, the thick continuous lines framing the surfaces form the seam lines 14. Not shown is a welding allowance edge which is necessary in practice. FIG. 7 shows in side view how the film cuts 22 shown in FIGS. 5a, b are joined together to form an actuator 31. Gripping surface 10 is that surface which touches the object to be gripped. Surface 11 forms the outer surface of the hollow film element 2 which is formed by surface 11 and the gripping surface 10. The surfaces 12 form a bellows-like structure and surface 13 forms the base surface 13 of the gripper which touches the base plate 5.

Figure 9:
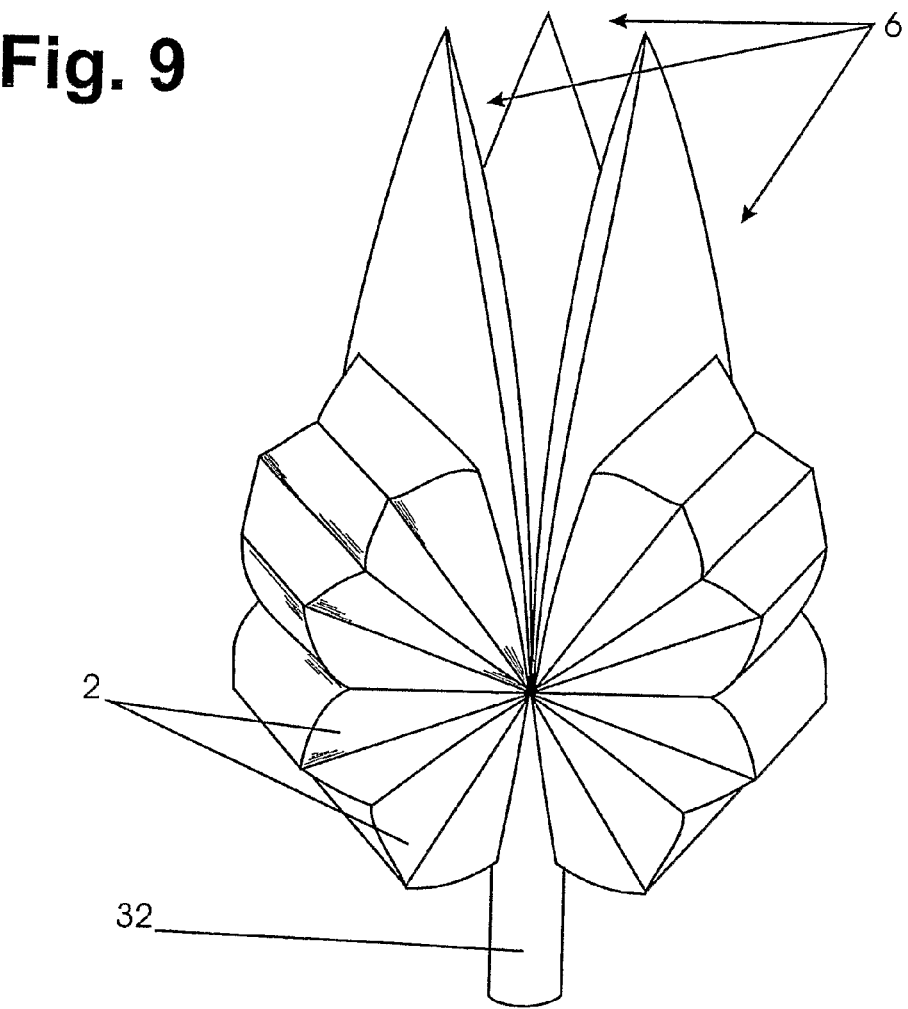
FIG. 9 is a three-leaf gripper without a base plate.

A variant to the exemplary embodiment of the actuators 31 as grippers is shown in FIG. 9. In this exemplary embodiment the base plate according to FIG. 3 is replaced by at least one or more further hollow film elements 2 per gripper element 6. When the actuators 31 are filled with compressed gas this is swivelled downwards and the three actuators 31 press towards one another in the lower part. They thereby also effect a positive and moment engagement.

In FIG. 9 the central region of the three actuators 31 is again fastened with a fastening element 9 (not shown) on a mechanical component 32—here in the sense of an example, on a tube—which on the one hand ensures the positive engagement to the gripped object and on the other hand ensures the supply and removal of compressed gas. The configuration of the component 32 is again not part of the device according to the invention and can be shaped and designed according to the intended use.

The invention claimed is:

1. A pneumatic gripper comprising:
   an active gripping element comprising:
      a plurality of interconnected layers of film cuts of a flexible but expandable gastight film, the plurality of interconnected layers of film cuts being interconnected to form a plurality of hollow film elements;
   a counteracting element disposed in opposition to the active gripping element;
   a connection for a compressed gas disposed in at least one hollow film element of the plurality of hollow film elements;
   wherein the plurality of hollow film elements are connected to one another so that when said plurality of hollow film elements are filled with the compressed gas, the plurality of hollow film elements execute a gripping movement causing motion of the active gripping element relative to the counteracting element; and wherein the active gripping element is configured in such a manner that the gripping movement is hindered when one of the hollow film elements engages with the counteracting element in a direction of movement other than that desired.

2. The pneumatic gripper according to claim 1, wherein only one of said hollow film elements executes the gripping movement during filling with the compressed gas.

3. The pneumatic gripper according to claim 1, wherein:
the plurality of interconnected layers of film cuts are joined to one another along a plurality of seam lines; and
the plurality of hollow film elements are joined to one another at a common edge about which they execute the gripping movement.

4. The pneumatic gripper according to claim 1, wherein the plurality of interconnected layers of film cuts comprise a textile-reinforced plastic film.

5. The pneumatic gripper according to claim 4, wherein the plurality of interconnected layers of film cuts are connected to each other by welding or adhesive bonding.

6. The pneumatic gripper according to claim 1, wherein:
the active gripping element comprises a single-leaf actuator formed from at least two of the plurality of hollow film elements; and
the plurality of hollow film elements are fixed at a common edge, or at one of the hollow film elements, by means of an external device.

7. The pneumatic gripper according to claim 6, wherein an outermost hollow film element is longer than other hollow film elements of the plurality of hollow film elements and can be used as a kinetic actuator.

8. The pneumatic gripper according to claim 6, wherein;
the pneumatic gripper is fixed on the external device;
a plurality of forces and moments exerted on the pneumatic gripper are diverted unilaterally onto the external device;
the single-leaf actuator executes the gripping movement during filling with compressed gas.

\* \* \* \* \*